UNITED STATES PATENT OFFICE.

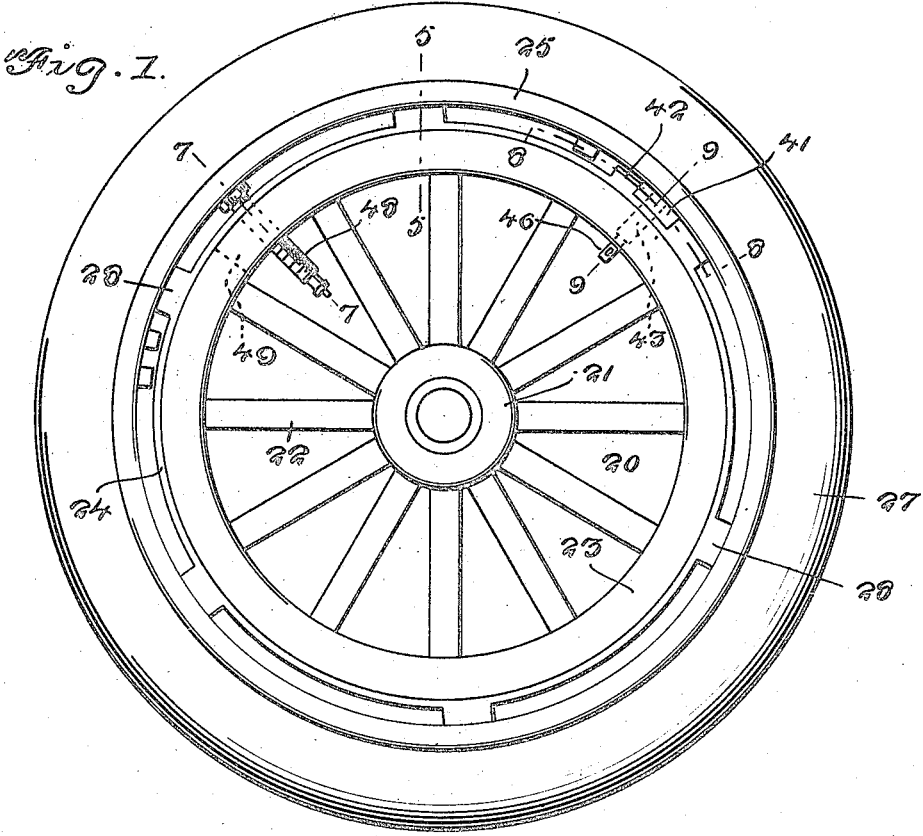
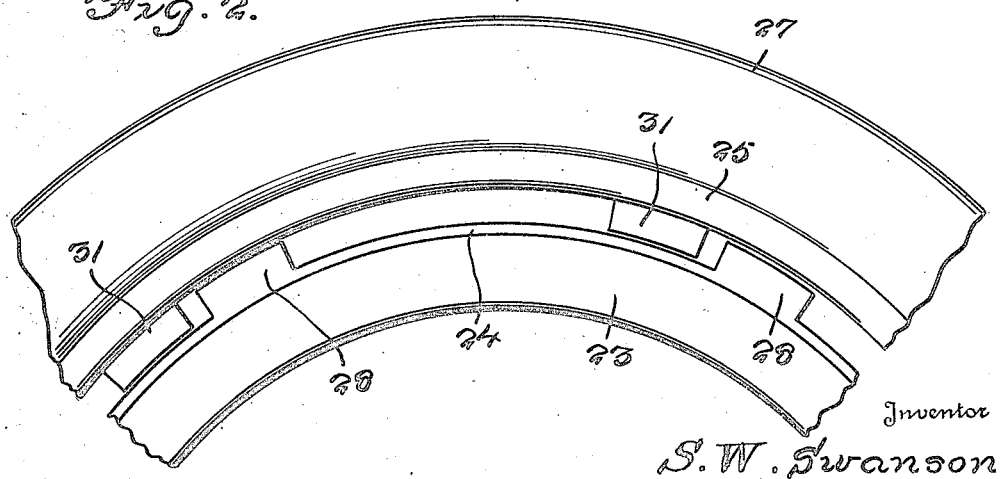

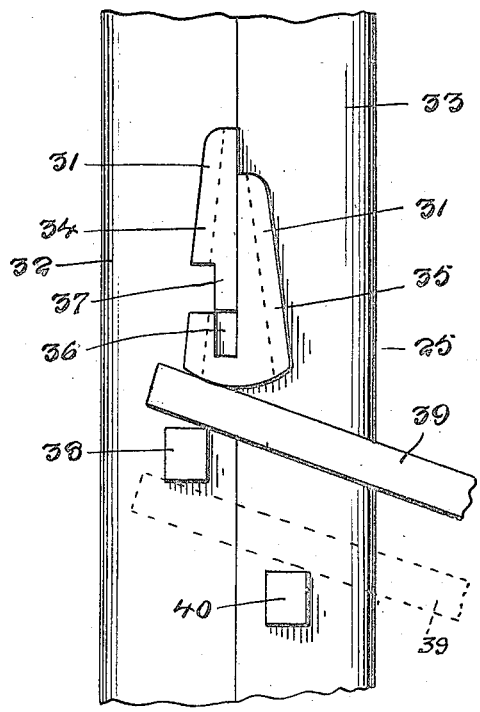
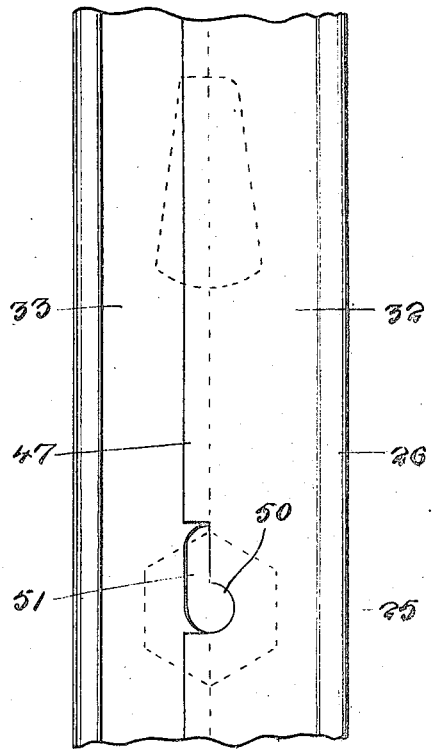
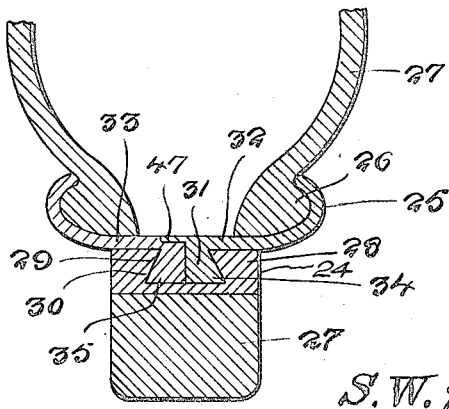

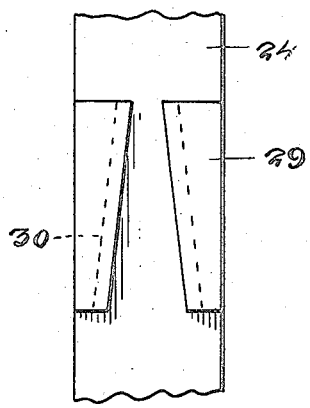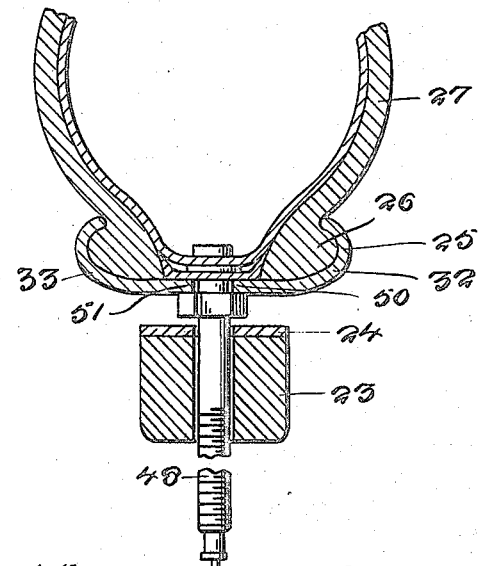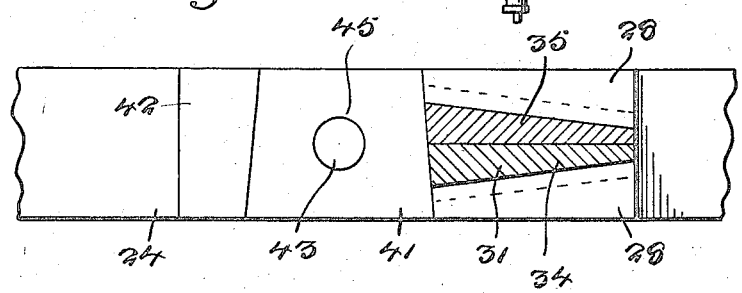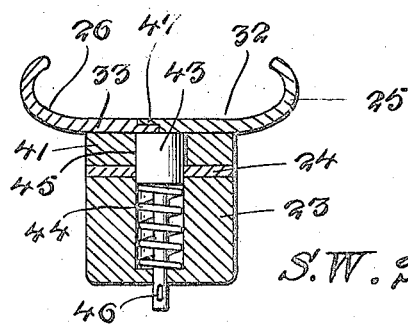

SHERWOOD W. SWANSON, OF JACKSONVILLE, FLORIDA.

DEMOUNTABLE RIM.

1,423,471.  Specification of Letters Patent.  Patented July 18, 1922.

Application filed October 18, 1919. Serial No. 331,727.

*To all whom it may concern:*

Be it known that I, SHERWOOD W. SWANSON, a citizen of the United States, residing at Jacksonville, in the county of Duval and State of Florida, have invented new and useful Improvements in Demountable Rims, of which the following is a specification.

The object of the invention is to provide a simple, inexpensive and efficient demountable rim construction wherein are combined facility in connecting the tire with or seating the same upon the rim, the seating or mounting of the demountable element or member upon the wheel, and locking the parts together so as to guard against accidental displacement or disarrangement in use while providing for the easy and expeditious dismounting of the removable rim member and substitution of a tire when an exchange is required; and further more to provide a rim of the demountable type wherein the use of bolts and nuts as securing means, together with the inconveniences incident to the loosening and replacing of the fastening devices in order to exchange tires, may be entirely eliminated.

Further objects and advantages of the invention will appear in the course of the following description of a preferred embodiment of the invention, it being understood that changes in form, proportion and details may be resorted to, within the scope of the appended claim, without departing from the principles involved.

In the drawings:

Figure 1 is a side view of a wheel having a demountable rim structure embodying the invention.

Figure 2 is a detail side view enlarged of a portion of the wheel showing the members of the rim in the positions which they occupy prior to the interlocking engagement thereof.

Figure 3 is a plan view viewed from the inner side of a portion of the demountable rim member.

Figure 4 is a plan view of the portion of the demountable rim member viewing the same from the outer side or the side in which the tire seat is formed.

Figure 5 is a transverse sectional view on the plane indicated by the dotted lines 5—5 of Figure 1.

Figure 6 is a plan view of a portion of the inner or fixed rim member showing the female element of the interlocking means whereby the demountable or removable rim member is secured thereto.

Figure 7 is a transverse sectional view on the plane indicated by the line 7—7 of Figure 1.

Figure 8 is a sectional view on the plane indicated by the line 8—8 of Figure 1 to show the means whereby the members of the rim are secured against relative disengaging movement.

Figure 9 is a transverse sectional view on the plane indicated by the line 9—9 of Figure 1.

Obviously the main wheel structure indicated at 20 having the hub 21, the spokes 22 and the felly 23 may be of the ordinary or any well-known construction, and combined therewith is the rim consisting of the fixed inner member 24 which is designed to be permanently secured to the felly 23 and the demountable or removable outer rim member 25 having the tire seats 26 formed therein and adapted for the reception of the tire 27 which may be of the clincher type shown in the drawings or of any of the other well-known types including the straight wall form, the only modification necessary to adapt the outer or removable member to these different types being the cross sectional formation of the seats, as will be readily understood by those who are familiar with this art.

The inner or fixed rim member is provided upon its exterior surface with means adapted to cooperate with means provided on the inner surface of the outer or demountable rim member, whereby an interlocking engagement between the two members may be secured, by a longitudinal movement of one of the members relatively to the other, and to this end the fixed rim member is provided with lugs 28 spaced apart to form a tapered seat 29 of which the walls converge longitudinally of the member and are undercut as shown at 30, while the outer or demountable rim member is provided with a male engaging member consisting of a wedge 31 which is tapered longitudinally of said rim member and is provided with undercut side edges to engage those of the walls of the seat 29 so that when the male or wedge member 31 of the outer rim member is positioned relatively to the female member or seat of the inner rim member and the outer rim member is turned upon the inner rim member so as to cause the former to move longitudinally relatively to the latter, the wedge 31 enters between the walls of the seat 29 and produces an interlocking relation between the two rim members which prevents lateral displacement of the outer member. Obviously the strain upon the movable rim member in causing this engagement may be modified to insure a tight and substantial interlock.

The outer or demountable rim member is composed of separable annular elements 32 and 33 each of which carries a section or segment of the tire seat so that the seat is formed by the complementary elements thereof carried respectively by the annular elements of the outer rim member and said elements of the outer rim member have an interlocking engagement with each other formed by longitudinally splitting the wedge 31 constituting the male member of the interlock between the outer and inner rim members to produce wedge elements 34 and 35 carried respectively by the elements of the outer rim member and formed respectively with a seat 36 and a tongue 37 representing female and male engaging elements and adapted to be engaged by a relatively longitudinal movement of the elements 32 and 33 as indicated most clearly in Figure 3. In order that this relative longitudinal movement of the elements of the outer rim member may be effected, after placing the tire 27 in the seats 26 under such condition as to insure a firm engagement of the parts, a lug 38 is formed on the inner surface of the outer rim member adjacent to the tapered elements of the wedge 31, so that a lever or pry bar 39 may be inserted between said lug 38 and the element 35 of the wedge (as also shown in Figure 3) to force the parts of the wedge into interlocking engagement. To facilitate the disengagement of the elements of the outer rim member an auxiliary lug 40 is provided upon the element 33, so that as shown in dotted lines the lever or tool 39 may be interposed between the lugs 38 and 40 to cause a relative movement of the elements 32 and 33 to disengage the wedge elements 34 and 35 and permit the separation of the elements of the outer rim member so as to dismount the tire.

After the outer rim member has been adjusted to interlock its elements as described and has been fitted upon and moved longitudinally with relation to the inner rim member so as to cause an interlocking engagement between the same by the engagement of the wedge 31 with the seat 29, the parts may be secured in this position by the insertion of a wedge plate 41, Figures 1, 8 and 9, between the larger end of the split wedge 31 carried by the outer rim member and a lug 42 formed on the exterior surface of the inner rim member. This wedge plate is secured in place against accidental movement, after the parts of the rim have been assembled, by a latch or bolt 43 actuated by a spring 44 for engagement with an opening 45 in said plate, said latch bolt being mounted in a suitable guide in the inner rim member and the felly 23 and having in its inner projecting extremity, beyond the inner contour of the felly, a socket 46 with which may be engaged a tool to withdraw the bolt in order to release the wedge plate and thus permit of a relative movement of the rim members which will enable the outer member to be dismounted.

Carried by one of the elements of the outer rim member is a joint breaking shield 47 to extend over the joint between said elements as indicated clearly in Figure 4, to exclude moisture, dust and the like, and the valve tube 48 is extended through an elongated opening 49 in the felly and the inner rim member and also through registering openings in the outer rim member at the adjacent edges of the elements thereof as shown at 50 and 51, the notch 51 being elongated so as to permit of the movement of one of said elements relatively to the other in causing the interlocking engagement of the elements 34 and 35 of the wedge 31 when the said elements of the outer rim member are secured together.

In order to dismount the tire so as to exchange the same, the first operation as will be understood is to release the locking wedge 41 by withdrawing the bolt 43 and then move the outer rim member backward relatively to the inner rim member after which the elements of the outer rim member may be moved relatively to disconnect the same from each other and liberate the tire. One of the outer rim elements should be then replaced upon the inner rim member, the tire fitted in place, the other outer rim member applied, and then the lever 39 should be inserted to cause relative movement of the outer rim element to cause the interlocking engagement thereof and also the movement of the outer rim member relative to the inner rim member to engage the wedge 31 with the seat 29, after which the wedge plate 41 may be inserted and locked by means of the bolt 43.

It is obvious that this operation can be accomplished with a minimum expenditure of time on the part of the operator and without the use of tools with the exception of a lever or rod such as that indicated at 39 for applying the necessary pressure to the parts as indicated, either to disengage or reengage the same.

What is claimed is:

A device of the character described comprising a pair of laterally separable annular elements, a plurality of projections formed upon one of said elements and projecting onto the other, said projecting portion being formed with recesses constituting seats, a plurality of projections formed upon the other element and provided with tongues adapted to enter said recesses, said projections being wedge shaped longitudinally and being dove-tailed in cross-section, the assembled projections being adapted for disposition within retaining sockets, and means for locking said elements against relative rotation.

In testimony whereof I affix my signature.

SHERWOOD W. SWANSON.